United States Patent [19]

Wagner et al.

[11] 4,184,200
[45] Jan. 15, 1980

[54] INTEGRATING I/O ELEMENT

[75] Inventors: Richard J. Wagner, West St. Paul; Robert A. Melberg, Bloomington, both of Minn.

[73] Assignee: Sperry Rand Corporation, New York, N.Y.

[21] Appl. No.: 899,908

[22] Filed: Apr. 26, 1978

[51] Int. Cl.² ............................................. G06F 1/00
[52] U.S. Cl. ................................................. 364/200
[58] Field of Search ... 364/200 MS File, 900 MS File

[56] References Cited

U.S. PATENT DOCUMENTS

| | | | |
|---|---|---|---|
| 3,609,697 | 9/1971 | Blevins | 364/200 |
| 4,031,517 | 6/1977 | Hirtle | 364/200 |
| 4,034,339 | 7/1977 | Free et al. | 364/900 |

*Primary Examiner*—Gareth D. Shaw
*Assistant Examiner*—C. T. Bartz
*Attorney, Agent, or Firm*—John L. Rooney; Kenneth T. Grace; Marshall M. Truex

[57] ABSTRACT

An integrating Input/Output (I/O) element containing an I/O processor that provides a computer with those functions normally associated with an I/O processor (or I/O controller) but which possesses architectural features to prevent compromise (i.e., unauthorized dissemination) of data in a multi-level secure environment. The I/O processor is programmable via an internal instruction memory which cannot be altered by the I/O processor and which cannot be accessed by any other portion of the computer (i.e., Central Processor Unit). The instruction memory is segmented providing a separate segment for each I/O channel. The instructions used to control each I/O channel are stored within the segment of instruction memory allocated to that I/O channel. A secondary memory, called the hand-off memory, is a read/write memory accessible by the Central Processor Unit (CPU) as well as the I/O processor. The hand-off memory is also segmented having a separate segment for each level of secure data to be stored within the hand-off memory. Each segment of the hand-off memory contains a subsegment allocated to each I/O channel permitted to handle the level of secure data associated with that segment of the hand-off memory. The control interface between the CPU and the I/O processor permits exchange of control and status information only. Therefore, all data transfers between the CPU and the I/O processor are via the hand-off memory. Because of the segmentation and subsegmentation of the hand-off memory, each such transfer is of a specific level of secure data and for a specific I/O channel.

6 Claims, 11 Drawing Figures

_Fig. 3_

_Fig. 6_

INTEGRATING I/O ELEMENT

GOVERNMENT CONTRACT

The invention herein described was made in the course of or under a contract or subcontract thereunder, with the U.S. Department of the Air Force.

BACKGROUND OF THE INVENTION

The present invention relates to data processing systems and more specifically to an architecture to prevent compromise (i.e., unauthorized dissemination) of data in a multi-level secure environment.

The efficiencies attendant to sharing hardware resources and the communication requirements of large systems dictate the need to handle data of multiple security levels within the same data processing system. Department of Defense Directive Number 5200.28, Dec. 18, 1972, provides an overall statement of Defense Department Policy regarding security of data within data processing systems. Section VI provides the minimum requirements. The normal method of preventing compromise of data in this environment is to maintain protection under software control. To accomplish this, computers are designed containing CPU(s) that are separated into one or more executive or control states and one or more task or worker states. Execution in a task state prohibits the use of certain computer instructions, bounds memory access to previously defined limits in terms of types of access (i.e., read, write, instruction, execution, etc.) and areas of access (i.e., which addressable locations), and prevents any I/O functions. CPU's which can prohibit compromise of data from one task state computer program to another exist according to many designs. The applications software or computer programs that perform most of the data processing system functions are executed in task states.

Control software is needed, however, to perform those housekeeping and administrative chores associated with I/O, resource sharing, and with enforcement of task state limitations. This control software is normally called an executive program. The executive program, by virtue of executing in one or more executive states, can execute those instructions not permitted in the task state and is not precluded, by hardware, from accessing any data within the CPU's memory nor from performing any I/O function. These capabilities are required by the executive program to enable it to perform its functions, but they also provide the capability of the executive program to compromise secure data. Therefore, such systems normally require the executive program to maintain a security level and degree of protection at least equal to that of the highest security level and highest degree of protection of any data in the system. Furthermore, unauthorized modification of the executive program can compromise the entire data base of the system.

The I/O transfers of computers are normally performed by one or more I/O processors (or I/O controllers) which operate asynchronously from the CPU(s). An I/O processor may provide the relatively complex functions of format conversion, arithmetic translations, and event analysis, or it may merely interface external I/O devices to the computer memory. In each situation, the necessary function is the transfer of I/O data. The I/O processor is usually programmable in modern computers of even moderate capacity but functions under control of the CPU, and hence the executive program. The executive program provides the interface between the I/O processor functions and the task programs which actually operate upon the I/O data. As stated earlier, the executive program is in a position to compromise secure data becauase of its unique controlling capabilities.

The present invention provides an alternative architecture that restricts CPU control of the I/O functions to the extent necessary to preclude compromise of secure data unless both software and hardware are compromised.

SUMMARY OF THE INVENTION

The present invention provides a computer architecture wherein a hand-off memory is the only read/write store within the computer. The hand-off memory provides the means whereby data is communicated between the data processor or CPU and the I/O processor. The data processor performs the normal data manipulation and arithmetic functions, as well as, communicating directly to local (i.e., physically adjacent) I/O devices. The I/O processor handles the protocol and interface computations required for remote (i.e., not physically adjacent) I/O devices. The I/O processor is programmable via an instruction memory which is internal to the I/O processor and is not alterable by it. The instruction memory is not accessible by the data processor.

The hand-off memory is characterized by its segmentation into areas directly corresponding to the various discrete security levels of the data to be stored and manipulated by the computer. The data stored within a given segment of the hand-off memory is considered to be of the security level corresponding to that segment. Subsegments of each hand-off memory segment are allocated to each I/O channel authorized to transfer data of the level of security corresponding to that hand-off memory segment. Each I/O transfer is initiated by the data processor which specifies the I/O channel, whether the transfer is input or output, the security level of the data, and the number of words to transfer. From this information the I/O processor can perform the desired I/O function (i.e., transferring I/O data to or from the appropriate subsegment of the hand-off memory).

Internally, the I/O processor has a communication data control element (CDCE) which is the programmable element controlling I/O data transfers. The CDCE executes programs stored within the instruction memory (IMEM). IMEM is unalterable by the CDCE and is not accessible by the data processor. All requests by the I/O processor to reference hand-off memory are initiated by the CDCE in response to an I/O function. A memory address translator (MAT) modifies the address for each reference based upon the security level of the data to be transferred and ensures that the address accompanying the request is within a subsegment allocated to the channel being used for the transfer. The security level of the data to be transferred for each I/O channel is maintained in a security register. The I/O channel being used for the transfer is determined by the segment of IMEM from which the instructions are being executed by CDCE.

The hardware actually interfacing with the I/O lines may be of a wide variety of designs utilizing diverse I/O protocols. The present invention makes provisions, however, for multiple I/O data interfaces to the hand-off memory. These interfaces would each be permitted to access some but not all segments of the hand-off memory. In this way, certain channels may be positively excluded by hardware from accessing certain segments (i.e., levels of secure data). A further feature of the I/O processor is the tag processor (TAG). TAG appends a segment level identifier to output data and removes the segment level identifier on input data for those I/O channels handling the highest levels of secure data. The segment level identifier appended to the I/O data ensures that the I/O data is read from the correct hand-off memory segment and written into the correct hand-off memory segment.

DESCRIPTION OF THE PREFERRED EMBODIMENTS

The present invention combines a number of functionally complex prior art elements into a unique architecture. No attempt is made herein to describe all of those elements in detail as much of that information is widely known. Detailed descriptions are provided, however, when necessary to properly practice the invention.

Figure 1:
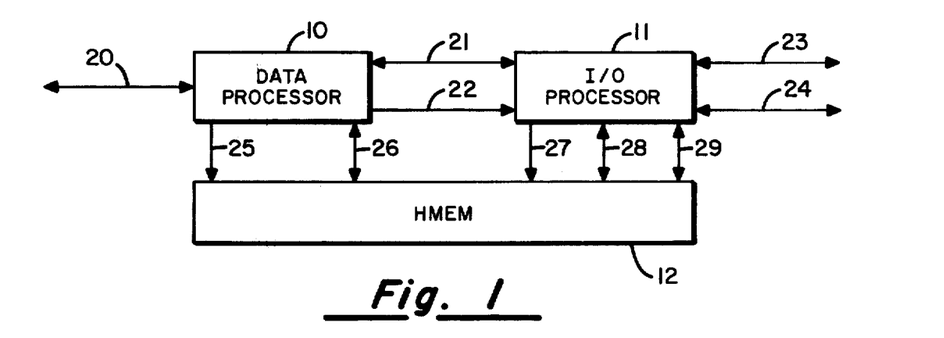
FIG. 1 shows the overall configuration of a computer employing the present invention.

The overall computer is shown in FIG. 1. I/O processor 11 provides the interface to remote I/O devices via lines 23 and 24 which represent multiple I/O channels. I/O processor 11 may access the hand-off memory, HMEM 12, by transferring an address and a read or write request via line 27. The data paths are represented by lines 28 and 29 which conduct data to and from HMEM 12. I/O processor 11 receives I/O commands from data processor 10 and returns status information via line 21. The interface via line 21 communicates only control and status information. The actual I/O data is communicated between data processor 10 and I/O processor 11 via HMEM 12. Data processor 10 transfers the segment level identifier (i.e., code representing level of secure data) for each I/O transfer command to I/O processor 11 via line 22. Data processor 10 performs those functions commonly thought of as being provided by a Central Processing Unit (CPU). These include data manipulation, arithmetic and logical functions. Data processor 10 interfaces to HMEM 12 via lines 25 and 26. The read or write access request along with the request address is transferred via line 25. The data is transferred to and from HMEM 12 via line 26. Line 20 provides a bi-directional path between data processor 10 and local (i.e., physically adjacent) I/O devices. This basic architecture is common to many existing computers and is quite familiar to those skilled in the art. Notice that data word and address word sizes are not provided because it can be anticipated that this basic architecture is applicable to machines with data word widths of 8-64 bits and address word widths of 12-30 bits using presently available technologies.

Figure 2:
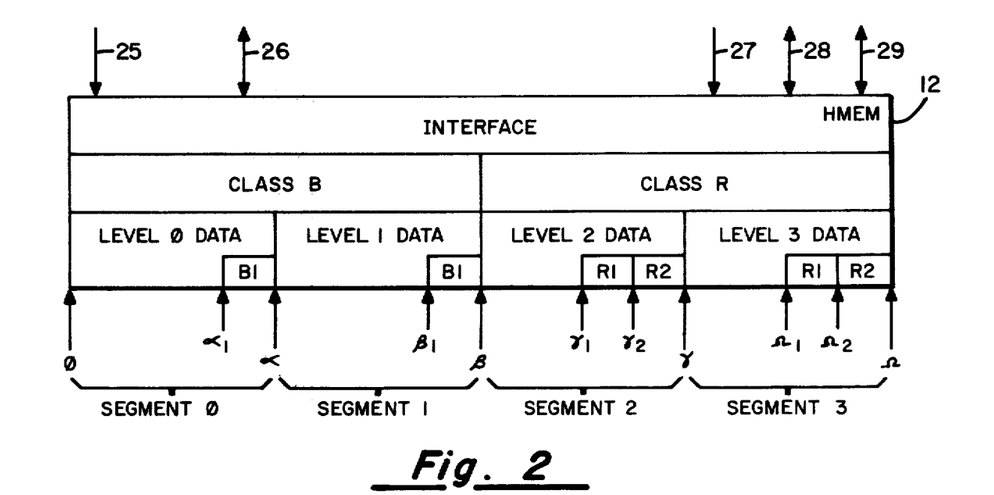
FIG. 2 illustrates the segmentation and subsegmentation of the hand-off memory.

FIG. 2 shows HMEM 12 configured for four discrete levels of secure data, Level 0, Level 1, Level 2 and Level 3. As shown in FIG. 2, these four discrete levels correspond to the four segments of HMEM 12, segment 0, segment 1, segment 2 and segment 3. These segments all exist within the same memory element (i.e., HMEM 12) and are partitioned only by address limits, although a separate memory element could be used for each segment. HMEM 12 is also configured for three I/O channels; B1, R1 and R2. These I/O channels are divided into Class B and Class R. I/O channel B1 is within Class B, and I/O channels R1 and R2 are within Class R. The Class B I/O channel (i.e., B1) may transfer only Level 0 and Level 1 data. Therefore, the Class B data interface via line 29 may access only segment 0 and segment 1. No data may be transferred between the Class B interface (i.e., line 29) and segments 2 and 3. Similarly, Class R, containing I/O channels R1 and R2, may transfer only Level 2 and Level 3 data. Therefore the Class R data interface via line 28 may access only segment 2 and segment 3. No data may be transferred between the Class R interface (i.e., line 28) and segments 0 and 1.

Each I/O channel authorized to access a segment of HMEM 12 is allocated a subsegment within that segment. Segment 0 and segment 1 each have a subsegment allocated to I/O channel B1. Segments 2 and 3 each have subsegments allocated to I/O channels R1 and R2. The I/O data transferred on an I/O channel is temporarily stored or buffered in the subsegment allocated to that I/O channel within the segment corresponding to the security level of the I/O data. Therefore, I/O data may be defined for the purposes of communication between data processor 10 and I/O processor 11 by stating whether it is input or output, identifying the I/O channel and amount of data (i.e., number of words, characters, bytes, etc.), and providing the segment level identifier (which specifies the level of data). Notice that by definition, a fixed addressable location within each subsegment (e.g., the first addressable location) always signifies the first addressable location of I/O data. Table A provides a definition of each segment and subsegment of HMEM 12.

Figure 3:
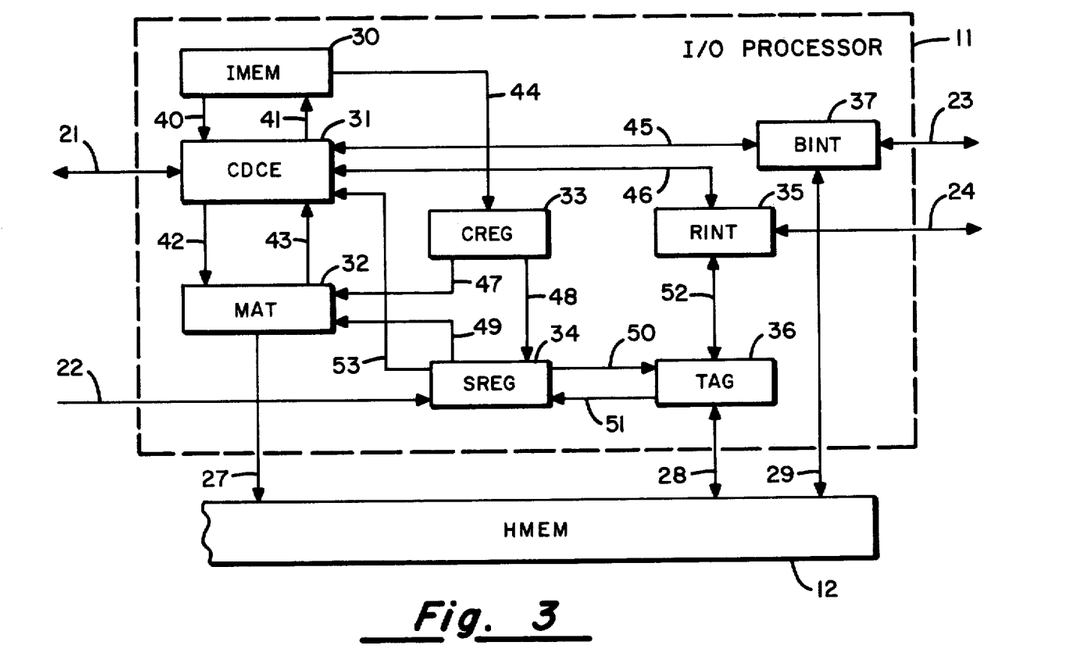
FIG. 3 shows the major elements of the I/O processor.

FIG. 3 provides a more detailed view of I/O processor 11. The major elements are the Communication Data Control Element, CDCE 31, the instruction memory, IMEM 30, the memory address translator, MAT 32, the channel register, CREG 33, the security register, SREG 34, the tag processor, TAG 36, and the two I/O line interface elements BINT 37 and RINT 35. CDCE 31 is a programmable processing element which controls the operation and timing of I/O processor 11. It also performs the prioritization of I/O function requests, maintains status of each I/O channel and all I/O function requests, and initiates all requests to access HMEM 12 for input and output data. CDCE 31 performs these tasks by executing instruction stored in IMEM 30. Those skilled in the art are aware that it is now common to design I/O processors utilizing programmable devices, such as CDCE 31, to perform these control and timing functions. Motorola Semiconductor Products, Inc., Microprocessor Applications Manual, 1975, at Chapter 3, provides a detailed review describing the use of a typical microprocessor (i.e., Motorola MC6800) in this mode. Each instruction is requested by the transfer of a read request and an instruction request address from CDCE 31 to IMEM 30 via line 41. The instruction is transferred from IMEM 30 to CDCE 31 via line 40.

TABLE A

| ADDRESS LIMITS | SEGMENT | LEVEL | CLASS | ADDRESS LIMITS OF SUBSEGMENTS |
|---|---|---|---|---|
| $0 \rightarrow \alpha - 1$ | 0 | 0 | B | $\alpha_1 \rightarrow \alpha - 1 \rightarrow B1$ |
| $\alpha \rightarrow \beta - 1$ | 1 | 1 | B | $\beta_1 \rightarrow \beta - 1 \rightarrow B1$ |
| $\beta \rightarrow \gamma - 1$ | 2 | 2 | R | $\gamma_1 \rightarrow \gamma_2 - 1 \rightarrow R1$ |
|  |  |  |  | $\gamma_2 \rightarrow \gamma - 1 \rightarrow R2$ |
| $\gamma \rightarrow \Omega - 1$ | 3 | 3 | R | $\Omega_1 \rightarrow \Omega_2 - 1 \rightarrow R1$ |
|  |  |  |  | $\Omega_2 \rightarrow \Omega - 1 \rightarrow R2$ |

CDCE 31 communicates with data processor 10 via line 21. Data processor 10 provides I/O transfer commands which include the I/O channel, whether the I/O transfer is an input or output, and the number of words to be transferred. This along with the segment level identifier (i.e., level of secure data) which is transferred to SREG 34 via line 22, provides the I/O processor with sufficient information to perform an I/O transfer. Notice that all I/O transfers begin from a fixed addressable location (e.g., the first addressable location) within the appropriate subsegment. The exact nature of the command information transferred (e.g., number of bits of data, coding scheme, etc.) is not important to the present invention. What is significant is that the exact location (i.e., address) within HMEM 12 of the I/O data is not transferred to I/O processor 11. This precludes data processor 10 from specifying the exact location in HMEM 12 of the data to be transferred. Furthermore, the segment level identifier is not transferred to CDCE 31. Therefore, CDCE 31 does not contain the exact location within HMEM 12 of the data to be transferred prohibiting compromise of the data in HMEM 12 through unauthorized modification of only the instructions being executed from IMEM 30.

Figure 4:
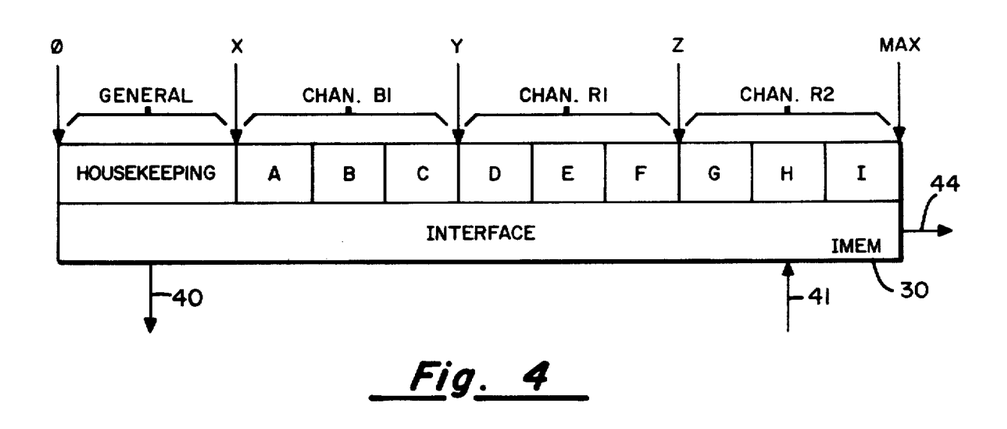
FIG. 4 illustrates the segmentation of the instruction memory.

FIG. 4 presents the organization of IMEM 30. Notice that IMEM 30 is configured to enable CDCE 31 to control three I/O channels, B1, R1 and R2. As explained above, IMEM 30 receives the instruction request address from CDCE 31, accesses the specified memory location, and transfers the instruction contained therein to CDCE 31 via line 40. The instructions are arranged by channel such that all instructions for channel B1, for example, are within address limits X to Y.

TABLE B

| ADDRESS LIMITS | CHANNEL | PROGRAMS |
|---|---|---|
| $0 \rightarrow X - 1$ | NO CHANNEL | HOUSEKEEPING |
| $X \rightarrow Y - 1$ | B1 | A, B, C |
| $Y \rightarrow Z - 1$ | R1 | D, E, F |

TABLE B-continued

| ADDRESS LIMITS | CHANNEL | PROGRAMS |
|---|---|---|
| $Z \rightarrow MAX - 1$ | R2 | G, H, I |

Table B presents the address limits for each of the I/O programs in IMEM 30. Referring again to FIG. 3, IMEM 30 also transfers each instruction request address to CREG 33 via line 44. As is explained in more detail below, CREG 33 determines the I/O channel being serviced from the instruction request address. CREG 33 provides an I/O channel designator corresponding to the I/O channel being serviced to MAT 32 via line 47 and to SREG 34 via line 48.

BINT 37 and RINT 35 represent the I/O channel interface hardware for Class B (i.e., I/O channel B1) and Class R (i.e., I/O channels R1 and R2) I/O channels respectively. The actual interface hardware will vary greatly depending upon the nature of the I/O channels and the protocols used. Line 23 represents the B1 I/O channel communication line. Line 24 represents the communication lines for I/O channels R1 and R2. Commands and timing are transferred to BINT 37 from CDCE 31 via line 45. Status is transferred to CDCE 31 from BINT 37 via line 45. Similarly, line 46 transfers commands and timing from CDCE 31 to RINT 35 and status from RINT 35 to CDCE 31. BINT 37 transfers I/O data to HMEM 12 for input and receives I/O data from HMEM 12 for output via line 29. As explained above, line 29 transfers data for only the Class B I/O channel (i.e., B1) and, therefore, only transfers data to and from segments 0 and 1 of HMEM 12.

In the preferred embodiment, I/O data for the Class R I/O channels (i.e., R1 and R2) is transferred to and from RINT 35 via TAG 36. On input, RINT 35 transfers I/O data to TAG 36 via line 52. TAG 36 removes the segment level identifier and transfers the remainder of the I/O data to HMEM 12 via line 28. TAG 36 transfers the segment level identifier to SREG 34 via line 51. On output, HMEM 12 transfers the I/O data to TAG 36 via line 28. TAG 36 receives the segment level identifier associated with the I/O channel being serviced from SREG 34 via line 50. TAG 36 appends the segment level identifier to the output data and transfers the result to RINT 35 via line 52. The utilization of TAG 36 requires use of a protocol wherein the segment level identifier is appended to the I/O data while it is being transferred between I/O devices. Furthermore, the utilization of such a protocol means that both receiving and transmitting devices must have a tag processing element. Therefore, the incorporation of TAG 36 is considered optional to the practicing of the present invention.

Figure 5A:
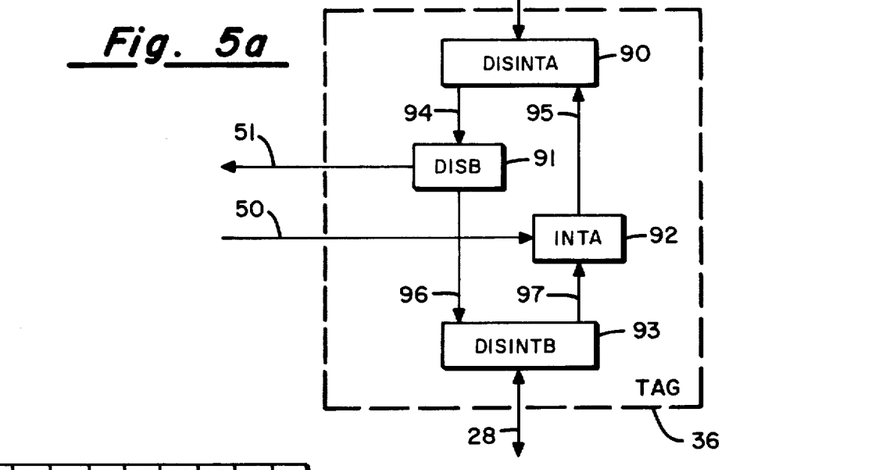
FIG. 5a illustrates the tag processor.

FIG. 5a presents a more detailed view of TAG 36. On input, the first differentiator, DISINTA 90, receives the I/O data via line 52. DISINTA 90 transfers the input I/O data to the disassembler, DISB 91, via line 94. DISB 91 removes the segment level identifier and transfers it to SREG 34 via line 51. The remainder of the I/O data is transferred to the second differentiator, DISINTB 93, via line 96. DISINTB 93 transfers the remainder of the I/O data to HMEM 12 via line 28. On output, HMEM 12 transfers the I/O data minus the segment level identifier to DISINTB 93 via line 28. DISINTB 93 transfers the I/O data minus the segment level identifier to integrator INTA 92, via line 97. SREG 34 transfers the segment level identifier of the I/O channel being serviced to INTA 92 via line 50. INTA 92 integrates these two quantities and transfers the resultant I/O data to DISINTA 90 via line 95. DISINTA 90 transfers the I/O data to RINT 35 via line 52.

Figures 5B, 5C:
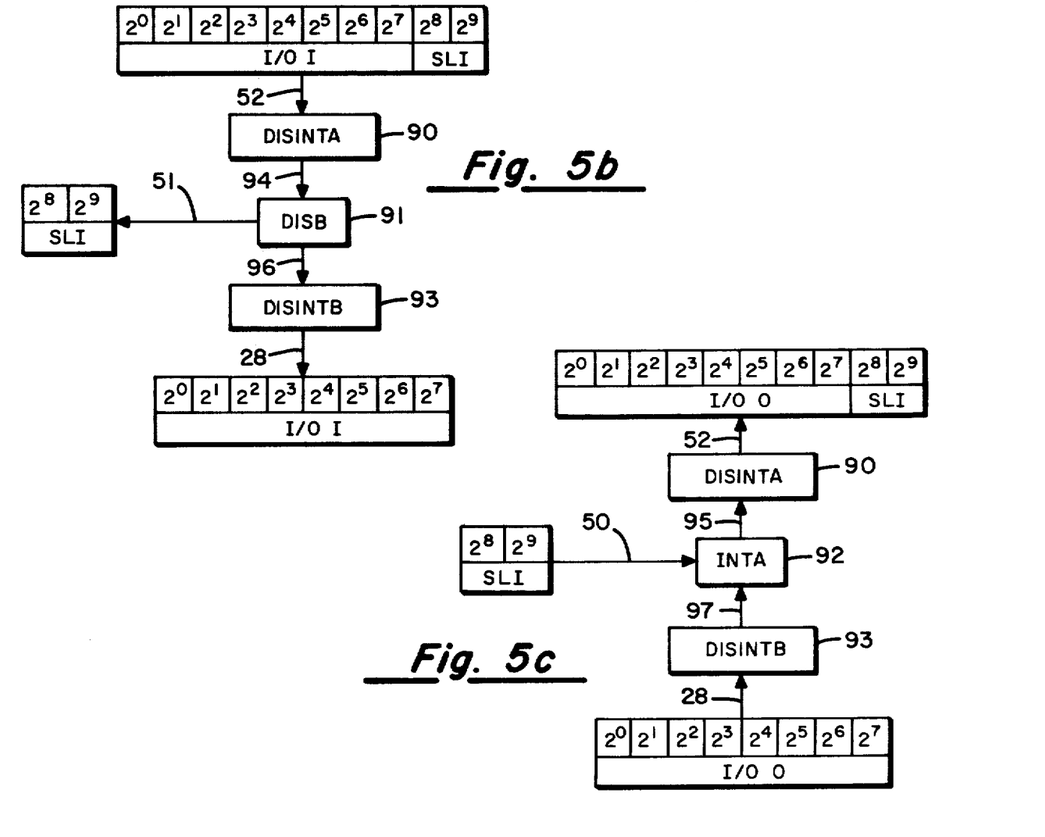
FIG. 5b shows the function of the tag processor on input.
FIG. 5c shows the function of the tag processor on output.

FIG. 5b shows the function of TAG 36 on input. In the preferred embodiment, I/O data is transferred in 8-bytes. Each 8-bit byte received via line 52 has a two bit segment level identifier (SLI) appended thereto. The two bit segment level identifier is sufficient to uniquely identify one of the four segments (levels of data) within HMEM 12. DISB 91 removes the two-bit segment level identifier and transfers it to SREG 34 via line 51. The remaining 8 bits (I/O I) are transferred to DISINTB 93 via line 96. DISINTB 93 transfers these 8 bits to HMEM 12 via line 28. FIG. 5c shows the function of TAG 36 on output. The 8-bit character to be output (i.e., I/O 0) is transferred from HMEM 12 to DISINTB 93 via line 28. I/O 0 is transferred to INTA 92 via line 97. SREG 34 transfers the two-bit segment level identifier of the I/O channel being serviced to INTA 92 via line 50. INTA 92 integrates these two quantities and transfers the 10-bit result to DISINTA 90 via line 95. DISINTA 90 transfers the 10-bit quantity to RINT 35 via line 52.

Referring to FIG. 3, SREG 34 maintains the segment level identifier for each I/O channel. The segment level identifier is a two-bit quantity which uniquely identifies one of the four segments of HMEM 12 (i.e., 0→level 0, 1→level 1, 2→level 2, and 3→level 3). The segment level identifier is received directly from data processor 10 via line 22 at the time CDCE 31 receives a command to initiate an I/O transfer. SREG 34 supplies the segment level identifier to MAT 32 via line 49 for final address computation. SREG 34 also supplies the segment level identifier to TAG 36 via line 50 to permit it to be appended to output data. SREG 34 receives the segment identifier from TAG 36 via line 51 for input I/O data as discussed above. SREG 34 compares this segment level identifier to the corresponding segment level identifier maintained for that I/O channel. A mismatch causes SREG 34 to generate an error interrupt to CDCE 31 via line 53.

To initiate an I/O transfer, data processor 10 transfers the I/O transfer command to CDCE 31 via line 21 which causes CDCE 31 to execute the I/O transfer initiate program associated with the corresponding I/O channel. See FIG. 3. As explained above, this means CDCE 31 executes instructions from IMEM 30 located within the segment corresponding to the I/O channel selected. Therefore, CREG 33 determines the I/O channel selected and transfers the I/O channel designator to storage selector SSEL 80 via line 48. See FIG. 6.

Figure 6:
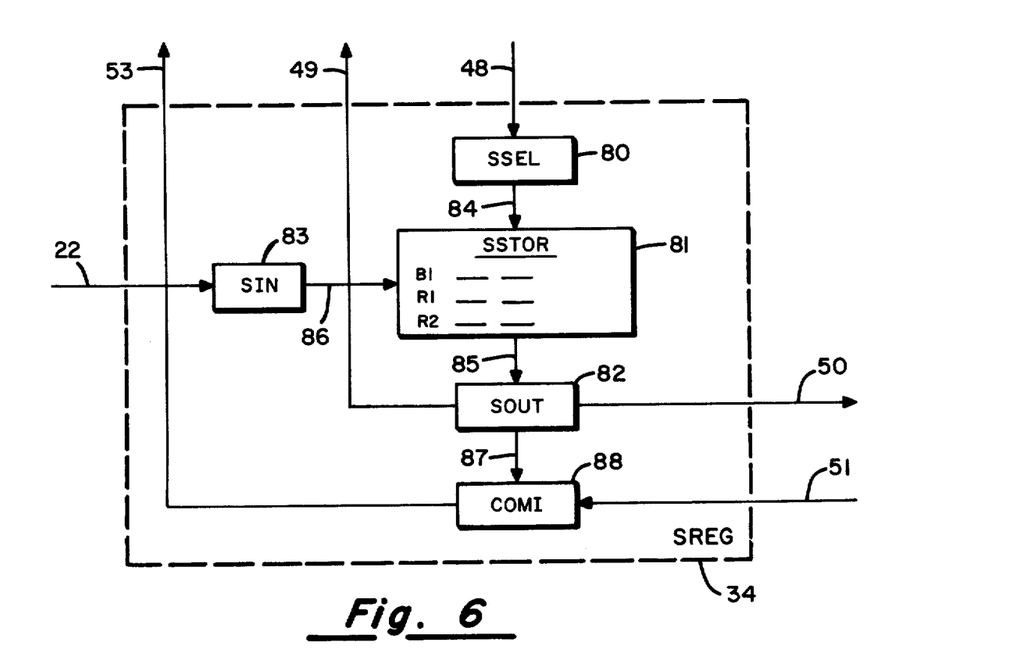
FIG. 6 illustrates the security register.

SSEL 80 selects the one of the three two-bit storage elements of segment storage, SSTOR 81, corresponding to the I/O channel designator. Data processor 10 transfers the segment level identifier as a two-bit quantity to input selector SIN 83 via line 22. SIN 83 transfers the segment level identifier to SSTOR 81, via line 86, for storage in the one of the three two-bit storage elements of SSTOR 81 corresponding to the I/O channel designator.

To supply the appropriate segment level identifier to MAT 32 and TAG 36, SSEL 80 selects one of the three two-bit storage elements of SSTOR 81 for output from SSTOR 81. The two-bit storage element selected corresponds to the I/O channel designator received from CREG 33 via line 48. The two-bit segment level identifier so selected is transferred to output selector SOUT 82 via line 85. SOUT 82 transfers the segment level identifier to TAG 36, via line 50, to be appended to output I/O data. SOUT 82 also transfers the segment level identifier to interrupt comparator COMI 88 via line 87. COMI 88 receives the segment level identifier from SOUT 82 and compares it with the segment level identifier received via line 51 which was removed from input I/O data by TAG 36. Should the comparison indicate inequality, COMI 88 transfers an error interrupt to CDCE 31 via line 53. Should the comparison not indicate inequality, of course, no error interrupt is generated.

Figure 7:
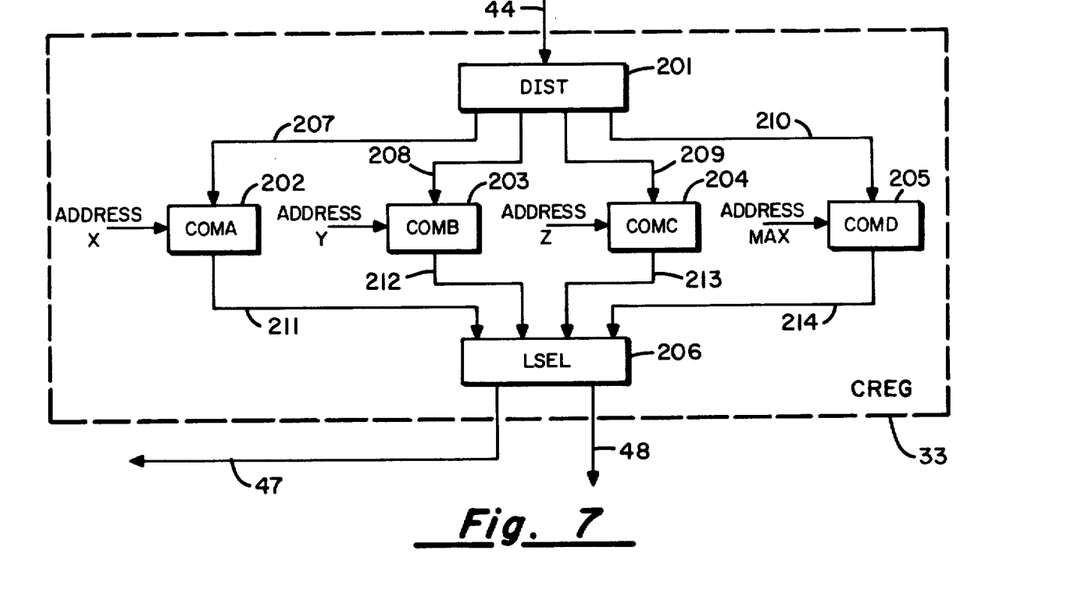
FIG. 7 illustrates the channel register.

As explained above, the function of CREG 33 is to determine from the instructions being executed by CDCE 31, which I/O channel is being serviced, if any. Notice that at times I/O processor 11 may not be servicing any I/O channel but may rather be doing housekeeping activities (i.e., test, performance monitoring, idling, scheduling, etc.). Referring to FIG. 3, IMEM 30 transfers each instruction request address to CREG 33 via line 44. From the instruction request address, CREG 33 determines which I/O channel is being serviced, if any. See also FIG. 4 and Table B for a definition of the address limits within IMEM 30 which uniquely define the I/O channel being serviced. Upon making its determination, CREG 33 generates an I/O channel designator of two bits (i.e., 0→No channel, 1→B1, 2→R1, 3→R2) which uniquely identifies the I/O channel (or no channel). The I/O channel designator is transferred to MAT 32 via line 47 and to SREG 34 via line 48. FIG. 7 represents the preferred embodiment of CREG 33. The instruction request address is received by the distributor, DIST 201, via line 44. DIST 201 merely transfers the instruction request address to each of the four address comparators; COMA 202, COMB 203, COMC 204, and COMD 205. Each of the four address comparators compares the instruction request address with a different fixed address. The fixed comparison addresses are:

COMA—Address X
COMB—Address Y
COMC—Address Z
COMD—Address Max

Each of the four comparators determine whether its fixed address is greater than the instruction request address. If the fixed address is greater than the instruction request address, each comparator sets its output line (i.e., COMA→line 211, COMB→line 212, COMC→line 213, and COMD→line 214) false. If the fixed address is less than or equal to the instruction request address, each comparator sets its output line true. Table C presents the results of these comparisons.

The I/O channel designator is determined from the results of these four comparisons by level selector LSEL 206. Lines 211, 212, 213 and 214 terminate at LSEL 206, as shown in FIG. 7. Table D provides the output of LSEL 206 as a function of the states of lines 211, 212, 213 and 214. The I/O channel thus determined is a two-bit quantity which is transferred to MAT 32 via line 47 and to SREG 34 via line 48.

Figure 8:
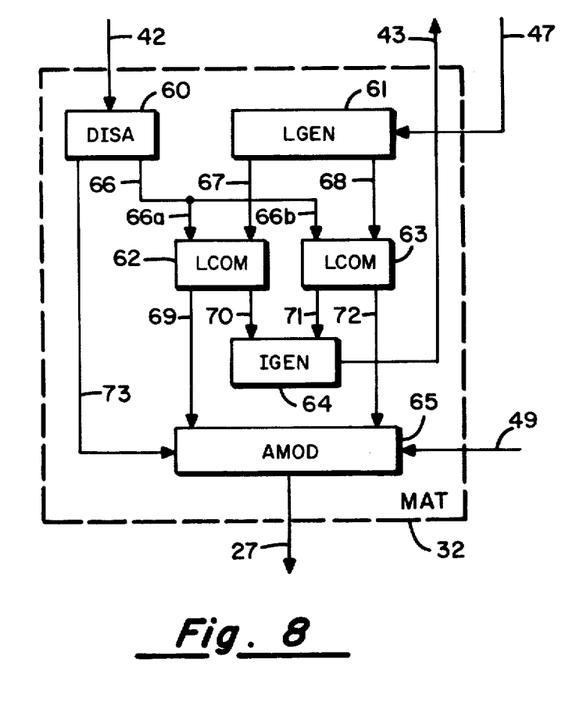
FIG. 8 provides a detailed view of the memory address translator.

MAt 32 generates the address for all access requests from I/O processor 11 to HMEM 12. See FIG. 3. Each access request is originated by CDCE 31. The read or write request and access address is transferred to MAT 32 via line 42. The access address is not the absolute address of a unique addressable location within HMEM 12, because CDCE 31 does not have the segment level identifier available to it. Therefore, the access address specifies a unique location in one of the segments of HMEM 12 but does not specify which segment. In the preferred embodiment, HMEM 12 contains $2^{13}$ addressable locations. To uniquely address one of those $2^{13}$ addressable locations requires an address of 13 bits. The access address generated by CDCE 31 is only 11 bits (i.e., the access address contains the 11 least significant bits of the address of one of the $2^{13}$ addressable locations of HMEM 12).

required to resolve the ambiguity (i.e., which segment of HMEM 12) providing the absolute address of the addressable location of HMEM 12 to be accessed. FIG. 8 provides a more detailed view of MAT 32. The read or write request and the access address are received via line 42 by disassembler DISA 60. The access address only is transferred by DISA 60 to lower comparator LCOM 62, via line 66a, and to upper comparator UCOM 63, via line 66b. DISA 60 transfers both the read or write request and the access address to the address modifier, AMOD 65, via line 73. The I/O channel designator is received by the limit generator, LGEN 61, from CREG 33 via line 47. The I/O channel designator defines one and only one subsegment within each segment of HMEM 12 and addressable by the I/O channel being serviced. See also FIG. 2 and Table A. LGEN 61 determines the lower limit of those subsegments and transfers these via line 67 to LCOM 62. LGEN 61 also determines the upper limit of those subsegments and transfers those via line 68 to UCOM 63. Table E defines the outputs of LGEN 61 for each I/O channel designator. Notice that for I/O channel designator of 00 (i.e., no I/O channel being serviced) both the lower limit and upper limit are 0. Note that the lower limit and upper limit generated by LGEN 61 are also 11 bit quantities

TABLE C

| X > Instruction request address ⟹ line 211 = False | COMA |
| X ≦ Instruction request address ⟹ line 211 = True | |

| Y > Instruction request address ⟹ line 212 = False | COMB |
| Y ≦ Instruction request address ⟹ line 212 = True | |

| Z > Instruction request address ⟹ line 213 = False | COMC |
| Z ≦ Instruction request address ⟹ line 213 = True | |

| MAX > Instruction request address ⟹ line 214 = False | COMD |
| MAX ≦ Instruction request address ⟹ line 214 = True | |

TABLE D

| LINE 211 | LINE 212 | LINE 213 | LINE 214 | BINARY I/O CHANNEL DESIGNATOR | CHANNEL |
|---|---|---|---|---|---|
| False | False | False | False | 00 | No Channel |
| True | False | False | False | 01 | B1 |
| True | True | False | False | 10 | R1 |
| True | True | True | False | 11 | R2 |
| True | True | True | True | UNDEFINED | |

To permit validation of the access address MAT 32 receives the I/O channel designator from CREG 33 via line 47. This validation assures that the access address is within a memory subsegment allocated to the I/O channel being serviced. Notice that this validation does not assure that the access address is the correct absolute address since it does not specify which of the segments of HMEM 12 is to be accessed. Line 43 permits MAT 32 to interrupt CDCE 31 if the subsegment of the access address is invalid. MAT 32 also receives the segment level identifier corresponding to the I/O channel being serviced from SREG 34 via line 49. The segment level identifier permits MAT 32 to modify the access address to permit access of the segment of HMEM 12 corresponding to the level of I/O data being transferred by the I/O channel being handled. The access address specifies the addressable location to be accessed within HMEM 12 within the segments permitted to be addressed by the I/O channel being serviced. Addition of the segment level identifier provides the information giving rise to the ambiguities shown in Table E, since all addresses shown are 13 bit quantities. Referring to FIG. 8, the lower limit is transferred to LCOM 62 via line 67 and the upper limit is transferred to UCOM 63 via line 68. LCOM 62 compares the access address received from DISA 60 via line 66a with the lower limit received from LGEN 61 via line 67. If the access address is greater than or equal to the lower limit, LCOM 62 sets line 69 true and line 70 false. If the access address is less than the lower limit, LCOM 62 sets line 69 false and line 70 true. UCOM 63 compares the access address received from DISA 60 via line 66b with the upper limit received from LGEN 61 via line 68. If the access address is less than the upper limit, UCOM 63 sets line 72 true and sets line 71 false. If the access address is greater than or equal to the upper limit, UCOM 63 sets line 72 true and sets line 71 false. IGEN 64 generates an interrupt to CDCE 31 via line 43 for each access address which is not within the limits of the subsegment allocated to the I/O channel being serviced. IGEN 64 generates an interrupt if line 70 is set true, if line 71 is set true, or if lines 70 and 71 are both set true.

TABLE E

| BINARY I/O CHANNEL DESIGNATOR | LOWER LIMIT | UPPER LIMIT |
|---|---|---|
| 00 | 0 | 0 |
| 01 | $\alpha_1$ or $\beta_1$ | $\alpha$ or $\beta$ |
| 10 | $\gamma_1$ or $\Omega_1$ | $\gamma_2$ or $\Omega_2$ |
| 11 | $\gamma_2$ or $\Omega_2$ | $\gamma$ or $\Omega$ |

Figure 9:
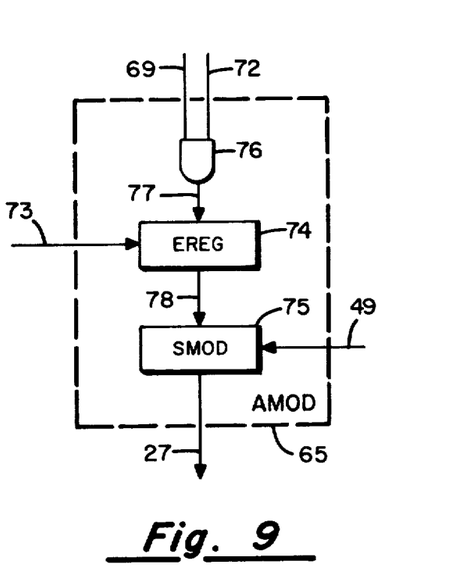
FIG. 9 illustrates the address modifier.

As stated above, DISA 60 transfers the access address and the read or write request to AMOD 65 via line 73. AMOD 65 transfers an access request to HMEM 12, along with the request address, if and only if both line 69 and line 72 are true. FIG. 9 provides a more detailed view of AMOD 65. The access address and the read or write request are received by enable register EREG 74, via line 73. EREG 74 transfers the access address and the read or write request to security modifier SMOD 75, via line 78, if and only if line 77 is true. AND 76 sets line 78 true, if and only if, both line 69 and line 72 are true. If line 69 is false or if line 72 is false, or if both line 69 and line 72 are false, AND 76 sets line 77 false. SMOD 75 receives the access address and the read or write request from EREG 74 via line 78. SMOD 75 also receives the segment level identifier from SREG 34 via line 49. SMOD 75 merely appends (as the two most significant bits) the two bit segment level identifier received from SREG 34 via line 49 to the 11 bit access address received from EREG 74 via line 78 to form the 13-bit requested address which uniquely addresses one of the $2^{13}$ addressable locations of HMEM 12. The requested address is transferred, along with the read or write request, to HMEM 12 via line 27.

As can be readily appreciated, the present invention may be practiced using a wide range of sizes of HMEM 12 and IMEM 30, as well as different numbers of I/O channels and HMEM 12 segments. Those skilled in the art will readily be able to apply the present invention to these variations.

What is claimed is:

1. A computer for processing multiple levels of secure data having a plurality of I/O channels comprising:

a segmented read/write memory having a separate segment corresponding to each discrete level of secure data to be processed wherein said separate segment contains a subsegment corresponding to each discrete I/O channel permitted to access data of the discrete level of secure data corresponding to said separate segment;

a data processor having access to said segmented read/write memory;

a segmented instruction memory unalterable by said computer containing a series of I/O instructions having a separate segment corresponding to each I/O channel;

a programmable communications data control element coupled to said segmented instruction memory and said segmented read/write memory having an interface to said data processor only for the exchange of command and status signals; wherein said programmable communications data control element is programmable through the execution of said series of I/O instructions;

means responsively coupled to said segmented read/write memory, said plurality of I/O channels, and said programmable communications data control element for transferring I/O data from said segmented read/write memory to each discrete I/O channel and for transferring I/O data from each discrete I/O channel to said segmented read/write memory, wherein transferring is controlled by said programmable communications data control element; and means responsively coupled to said segmented instruction memory, said programmable communications data control element, and said segmented read/write memory for restricting the access to said subsegment corresponding to the discrete I/O channel being serviced.

2. A computer according to claim 1 wherein said restricting means further comprises:

a channel register responsively coupled to said segmented instruction memory which determines the discrete I/O channel being serviced;

a security register responsively coupled to said channel register and said data processor which maintains an indication of the level of secure data being transferred by the discrete I/O channel being serviced; and a memory address translator responsively coupled to said programmable communications data control element, said segmented read/write memory, said channel register and said security register which restricts each memory access to said subsegment of said segmented read/write memory corresponding to the I/O channel determined by said channel register and the level of secure data indicated by said security register.

3. A computer according to claim 2 wherein said transferring means further comprises:

a tag processor responsively coupled to said segmented read/write memory and said security register to append said indication of the level of secure data being transferred to output I/O data and to remove said indication of the level of secure data being transferred from input I/O data.

4. In a computer for processing multiple levels of secure data having a data processor and having a plurality of I/O channels wherein each I/O channel is authorized to transfer data from at least one of said multiple levels of secure data between said computer and at least one of a plurality of peripheral equipments and having a segmented read/write memory coupled to said data processor wherein each of said multiple levels of secure data corresponds to a different segment of said segmented read/write memory and having a segmented instruction memory containing a series of I/O instructions corresponding to each of said plurality of I/O channels and wherein said series of I/O instructions corresponding to each of said plurality of I/O channels corresponds to a different segment of said segmented instruction memory and having a programmable communications data control element coupled to said segmented read/write memory, said data processor, and said segmented instruction memory, which is programmable through the execution of said series of I/O instructions corresponding to each of said plurality of I/O channels for controlling the transfer of data between said computer and said plurality of peripheral equipments via a one of said plurality of I/O channels corresponding to said series of I/O instructions, the improvement comprising:

- a plurality of subsegments within said segmented read/write memory wherein each segment of said segmented read/write memory contains at least one of said plurality of subsegments and wherein each subsegment within a one segment corresponds to a different one of said plurality of I/O channels authorized to transfer data of the one of said multiple levels of secure data corresponding to said one segment and wherein each of said plurality of I/O channels corresponds to a different one of said plurality of subsegments within each segment of said segmented read/write memory corresponding to each of said multiple levels of secure data for which said each of said plurality of I/O channels is authorized to transfer; and
- means responsively coupled to said plurality of I/O channels, said programmable communications data control element, and said segmented read/write memory for ensuring that each of said plurality of I/O channels transfers data only to and from a corresponding one of said plurality of subsegments.

5. A computer according to claim 4 wherein said ensuring means further comprises:
- means responsively coupled to said data processor for storing a code representing a one of said multiple levels of secure data to be transferred;
- means responsively coupled to said segmented instruction memory for determining a one of said plurality of I/O channels based upon a one segment of said segmented instruction memory containing said series of I/O instructions through the execution of which said programmable communications data control element is being programmed; and
- means responsively coupled to said storing means, said determining means, and said segmented read/write memory for permitting transfers to and from said segmented read/write memory only from the one of said plurality of subsegments corresponding to said one of said plurality of I/O channels as determined by said determining means and said one of said multiple levels of secure data to be transferred represented by said code stored within said storing means.

6. A computer according to claim 5 further comprising:
- means responsively coupled to said storing means and said plurality of I/O channels for inserting said code representing said one of said multiple levels of secure data to be transferred into each transfer to said plurality of peripheral equipments;
- means responsively coupled to said plurality of I/O channels for removing said code representing said one of said multiple levels of secure data to be transferred from each transfer from said plurality of peripheral equipments; and
- means responsively coupled to said removing means and said storing means for transferring said code removed from each transfer from said plurality of peripheral equipments to said storing means.

* * * * *